Figure 1:
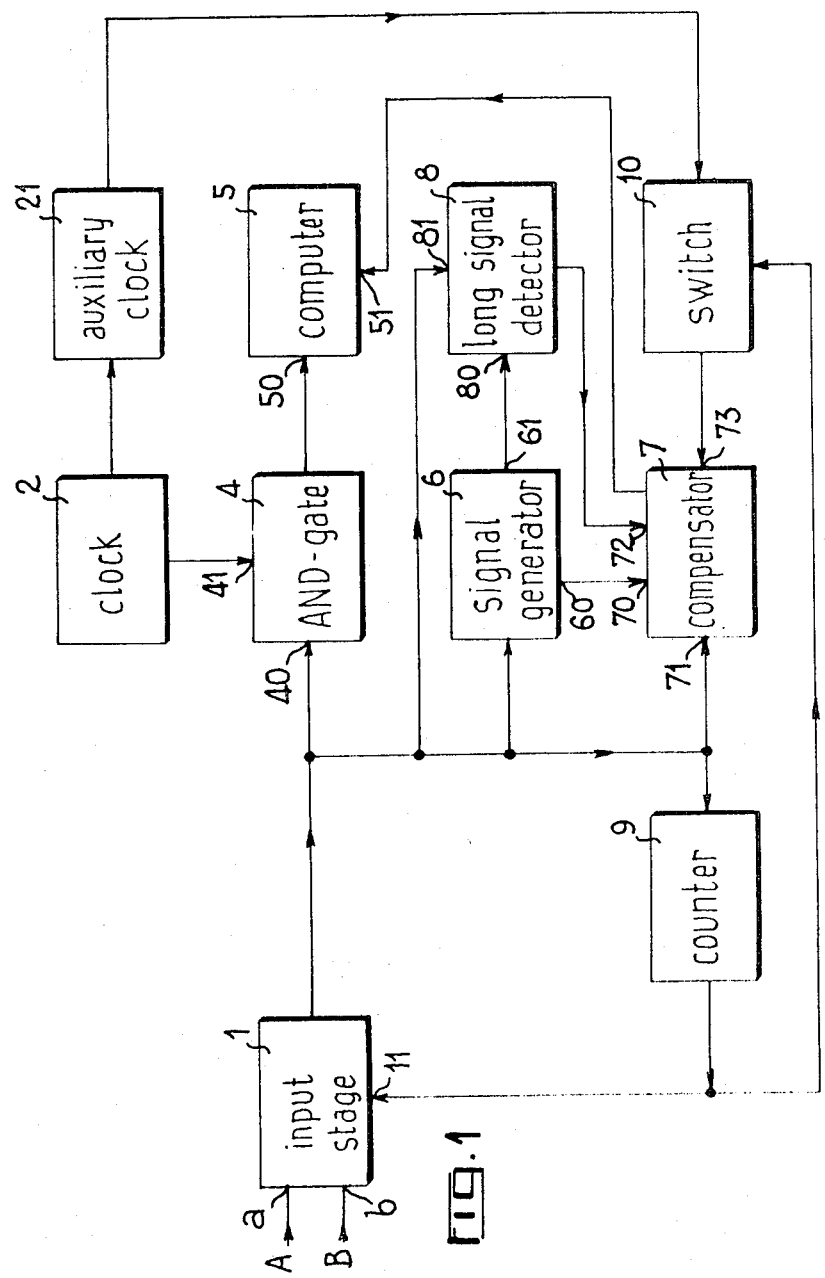

United States Patent

[11] 3,622,879

| [72] | Inventors | Andre Girouy;<br>Paul Zagigaeff; Gerard d'Auzac; Jean Douzon, all of 75 Paris (France) 51, rue de l'Amiral Mouchez (13 eme), Paris, France |
|---|---|---|
| [21] | Appl. No. | 34,142 |
| [22] | Filed | May 4, 1970 |
| [45] | Patented | Nov. 23, 1971 |
| [32] | Priority | May 12, 1969 |
| [33] | | France |
| [31] | | 6915315 |

[54] PHASEMETERING SYSTEM INCLUDING NOISE COMPONENT CORRECTING MEANS
6 Claims, 2 Drawing Figs.

[52] U.S. Cl. .................................................. 324/83 D
[51] Int. Cl. ............................................... G01r 25/00
[50] Field of Search .......................................... 324/83 D, 186, 187

[56] References Cited
UNITED STATES PATENTS
| 3,540,053 | 11/1970 | Sparagna et al. .............. | 324/83 D |
| 3,286,176 | 11/1966 | Birnborm ..................... | 324/186 X |

Primary Examiner—Alfred E. Smith
Attorney—Kurt Kelman

ABSTRACT: In a digital phasemeter of the type comprising an input stage for generating gating signals having duration $P_i$ proportional to the phase-shift between two signals, and a computer for averaging the $n$ signals $P_i$ obtained in the course of $n$ successive measurement, a correcting circuit is provided for compensating the errors equal in absolute value to $T$ affecting the duration of the gating signals when, because of noise, a small real phase-shift (near zero) has given rise to a long gating signal (near $T$) or a large phase-shift (near $2\pi$) to a short gating signal (near zero).

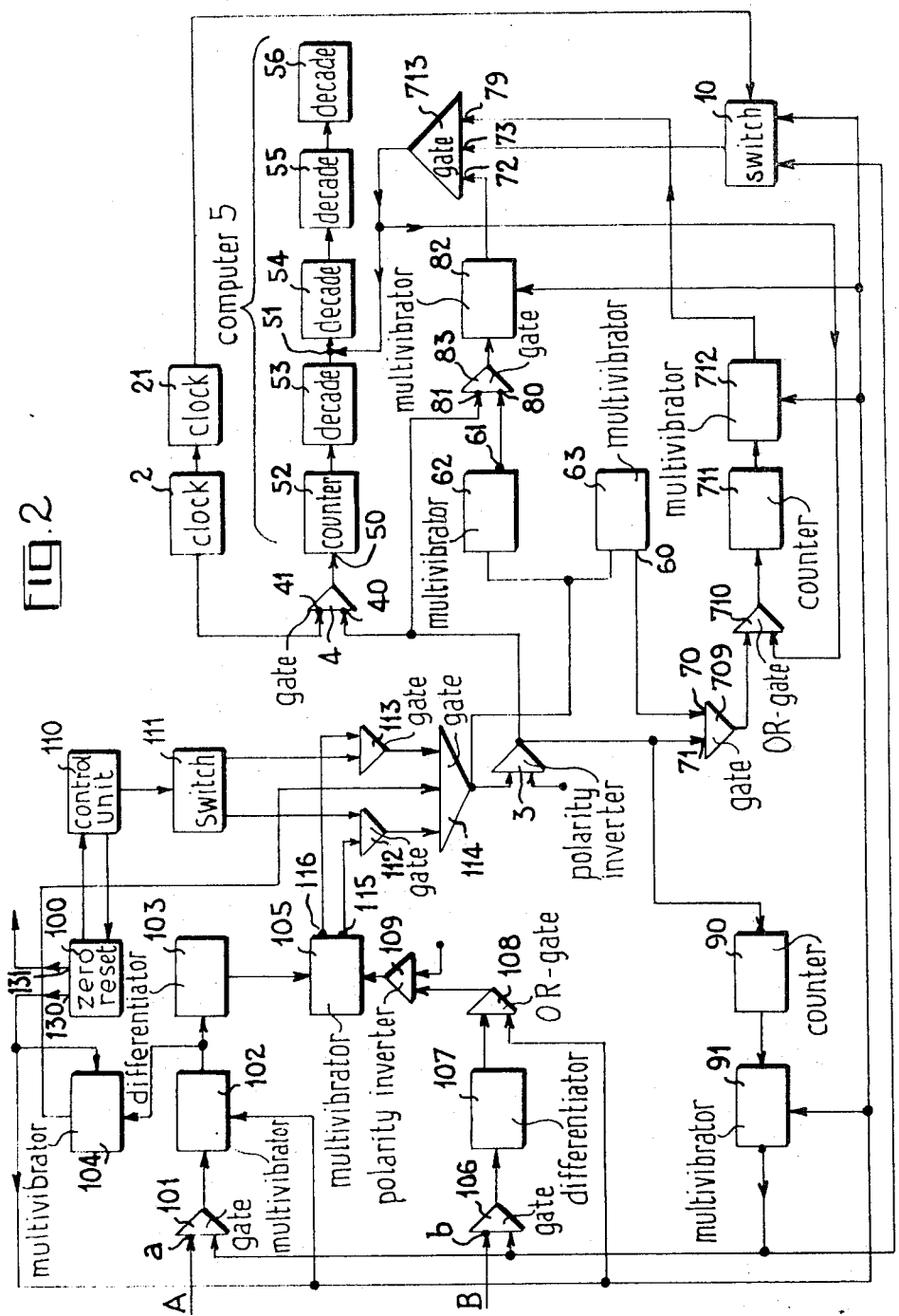

PHASEMETERING SYSTEM INCLUDING NOISE COMPONENT CORRECTING MEANS

The present invention relates to digital phasemeters for measuring the phase-shift $\Delta\Phi (0 \leq \Delta\Phi < 2\pi)$ of a signal whose nominal periodicity is T, in relation to a reference phase signal of the same periodicity.

These phasemeters reduce the measurement of the phase-shift $\Delta\Phi$, to the measurement of a time interval $P=\Delta\Phi/2\pi$. T separating two corresponding instants of the input signal and the reference phase signal, the time $P$ being expressed by the number N of clock pulses appearing during the time interval $P$.

In order to minimize errors due to noise components which may be contained in the input signal, it is well known to utilize a computer device which calculates the mean:

$$N = \frac{N_1 + N_2 \ldots N_n}{n}$$

of the $n$ numbers $N_i (i=1, 2 \ldots n)$ obtained during the course of a cycle of $n$ consecutive measurements.

However, this solution is admissible only if each measured time interval $P_i$ is equal to $P+e$, where $e$ is the error due to noise. In fact, however, certain measured time intervals $P_i$ may be equal to $P+e$ only to within T. In other words, if $P$ is close to zero, a slight negative error $e$ can render $P+e$ negative and one would then be measuring $P+e+T$; similarly, if $P$ is close to $T$, a slight positive error $e$, making $P+e>T$, could lead to the measurement of $P+e-T$.

However, the calculated mean which tends to effect compensation of the errors $e$ due to noise, in the sum $S=N_1+N_2\ldots+N_n$ of the numerical results obtained in the course of a measurement cycle, will not have this beneficial effect in respect of the errors due to the fact that the measurements disregard multiples of T, the corresponding errors all being of the same sign (positive in the case of small real phase-shifts, negative in the case of large real phase-shifts).

It is an object of this invention to overcome this drawback.

According to the invention, there is provided a digital phasemeter for measuring the phase-shift $\Delta\Phi (0 \leq \Delta\Phi < 2\pi)$ of a nominally periodic input signal in relation to a reference phase signal of the same periodicity T, comprising:

an input stage, having an output, for the production, from the input signal and the reference signal, of gating signals of duration $P_i$ equal to the time interval separating two homologous zero points in the input and reference signals;

a clock, having an output, for delivering pulses of recurrence frequency $F=N_o/T$, where $N_o$ is a positive integer;

a gating device comprising a signal input connected to said output of said clock, a control input coupled to said output of said input stage, and an output, for transmitting the pulses from said clock only in the presence of said gating signals;

a computer device coupled to said output of said gating device, for delivering, for each measurement cycle corresponding to the production of $n$ gating signals where $n$ is a positive integer, a number, equal, module $N_o$, to the whole number part of the quotient $S/n$, where:

$$S = R + N_1 + N_2 + \ldots + N_n$$

$N_i (i=1, 2\ldots n)$ being the number of pulses transmitted by said gating device during the time of the gating signal $P_i$, and $R$ a number determined by the initial state of the memory elements of the computer device;

a correcting circuit having: an output coupled to said computer device; first means for applying to said computer device, at the end of a measurement cycle, pulses, referred to as correction pulses, with the effect that number $N$ is automatically substituted by a number $N'$ which is equal, modules $N_o$, to the whole number part of the quotient $S'/n$, where $S'$ is equal to $S+(n-m)N_o$, where $m$ is the number of said gating signals whose duration exceeds a predetermined duration L smaller than T; and second means for authorizing or inhibiting the operation of said first means as a function of at least one criterion concerning the distribution of said $n$ gating signals into three categories, the first of which comprises the gating signals, whose duration does not exceed a given value $\alpha$, the second of which comprises the gating signals whose duration exceeds $\alpha$ without exceeding a given value $\beta$ greater than $\alpha$, and the third of which comprises the signals whose duration exceeds $\beta$, $\alpha$ and $\beta$ being two durations smaller than T, one of which is equal to said duration L.

The invention will be better understood and other of its features rendered apparent, from a consideration of the ensuing description and the related drawings in which:

FIG. 1 is the basic diagram of a phasemeter in accordance with the invention; and FIG. 2 illustrates a detailed embodiment of a phasemeter in accordance with the invention.

It is assumed, by way of example, in the embodiments of FIGS. 1 and 2:

a. that the number $m$ is equal to the number of gating signals whose duration is greater than $\alpha$;

b. that the second means in the correcting circuit inhibit the operation of the first means, only in the case where no gating signal of duration longer than $\beta$ has arrived during the course of the measurement; in other words they authorize this operation under the sole condition that at least one gating signal of duration greater than $\beta$ has arrived during the course of the measurement cycle.

In the case of FIG. 1, it is further assumed that the measurement of the $P_i$ values is effected over a reference period T so that the duration of no $P_i$ signal can exceed T.

Before describing the phasemeter illustrated in FIG. 1, one will justify the corrections which the correcting circuit is to make on the number N, and the conditions, as far as noise is concerned, in which this phase meter will operate correctly, will be indicated.

The $P_i$ signals are distributed in three categories as a function of their duration:

category I: $0 < P_i \leq \alpha$, "short" signals
category II: $\alpha < P_i \leq \beta$, "medium" signals
category III: $\beta < P_i$, "long" signals.

One will designate by $n_1$, $n_2$ and $n_3$ respectively the number of short signals, medium signals, and long signals, obtained during a measurement cycle, and by $n' = n_2 + n_3$ the number of signals whose duration is longer than $\alpha$.

A real phase-shift $\Delta\Phi$ will be referred to as small, medium, or large depending upon whether the corresponding correct gating signal $P=\Delta\Phi/2\pi$. T is short, medium, or long respectively.

In the conditions of the example, it is assumed that, for correct operation of the phase meter, the absolute value of the error $e$ due to the noise component, remains less than half of the shortest of the durations $\alpha$, $\beta - \alpha$, $T - \beta$.

This is tantamount to saying that the gating signals obtained for a given real phase-shift cannot be distributed between more than two categories.

Under these conditions, the error due to the measurement within $T$ of the duration of a gating signal, which is erroneous due to the noise component, cannot occur a priori, except in the two following cases:

1. $P$ is a long signal, the $P_i$ values being distributed between category III and category I, in this case because of a positive error.

The error in S due to measurement to within $T$, is $-n_1 . N_o = -(n-n')N_o$.

2. $P$ is in the category I, the $P_i$ values are distributed between categories I and III, in this case as a consequence of a negative error $e$.

The error in S due to measurement to within $T$, is $+n_3 N_o$.

However, it flows from the assumption made hereinabove, that in these two cases $n_2 = 0$, so that $n_3 = n'$ and the remainder resulting from the division, by $N_o$, of:

$$R = \frac{N_1 + N_2 + \ldots N_n - n_3 N_0}{n}$$

is identical to the remainder of the division, by $N_o$, of $$\frac{R + N_1 + N_2 + \ldots + N_n + (n-n')N_0}{n}$$

In all other cases, $n_1$ or $n_3$ will be zero and no correction will be effected.

It will be assumed in the following that $\alpha = T/3$, $\beta = 2T/3$, and this gives a maximum value of $T/6$ for the permissible error $e$ under the condition defined.

In FIG. 1, the input stage 1 receives at its inputs $a$ and $b$ respectively the reference signal A and the input signal B, which signals may or may not be sinusoidal signals, the concept of phase-shift being understood here in the broad sense as applicable to all periodic signals in which it is possible to distinguish homologous zero intersection points in a cycle of one and a cycle of the other.

The stage 1 produces at its output, in a conventional way, gating signals of substantially rectangular waveform $P_i$ corresponding in duration to the time interval separating two homologous points in the two signals A and B, where $0 \leq P_i < T$.

Its output is connected to the control input 40 of an AND-gate 4.

A clock 2 produces pulses of constant recurrence frequency $F = N_o/T$, $N_o$ thus being the number of pulses supplied by the clock during the period $T$; these pulses are applied to the signal input 41 of the gate 4. The output of the gate 4 is connected to the main input 50 of a computer device 5 which, in the absence of a correction-authorizing signal, will simply take the mean $$N = \frac{N_1 + N_2 + \ldots + N_n}{n}$$

(it is assumed that $R=0$).

A gating signal counter 9, whose input is connected to the output of the input stage 1, produces at its output, after the $n^{th}$ gating signal, a blocking or inhibit signal which is applied to an input 11 of the stage 1 in order to inhibit operation of the stage.

The output of the stage 1 also supplies a signal generator 6. The latter is controlled by the front edge of the gating signals $P_i$ to produce in response to each of these signals respectively at its outputs 60 and 61, a rectangular signal of duration $2T/3$ and a rectangular signal of duration $2T/3$.

The output 60 supplies the input 70 of a "compensator device" 7. This device receives the gating signals from stage 1 at its input 71, compares each of them with the signal of duration $T/3$ of the same time origin, and stores the number $n' = n_2 + n_3$ of gating signals which have a duration greater than $T/3$.

The output 61 of the generator 6 is connected to the input 80 of a "long gating signal detector" 8, to whose input 81 the gating signals are applied. The output of the detector 8, in this example, produces a correction-authorizing signal as soon as it detects a long signal ($P_i > 2T/3$), and is corrected to an input 72 of the device 7.

An auxiliary clock 21, synchronized by an auxiliary output of the clock 2, produces pulses of a frequency $f$ lower than F, which allows a more reliable operation of the connecting circuit.

At the end of the measurement cycle, the inhibit or blocking signal produced by the gating signal counter 9, closes a switch 10 arranged between the output of the clock 21 and a fourth input 73 of the device 7, the latter collecting $n_1 = n - n'$ pulses from the clock 21 and applying them to an auxiliary input 51 of the computer device 5 where they are equivalent, to $n_1 N_o$ pulses applied at the main input 50.

The computer device 5 then displays the number N' which is equal to the remainder of the division, by $N_o$, of the whole number part of the quotient:

$$\frac{R + N_1 + N_2 + \ldots + N_n + n_1 N_0}{n}$$

The diagram of FIG. 2 illustrates a preferred embodiment of the invention.

This device can, for example, form part of a telemetry device using an infrared beam amplitude-modulated by a sinusoidal signal used as the phase reference.

By conventional operations (frequency changing, amplification, double clipping), the reference signal and the signal modulating the reflected wave are converted into rectangular waveform signals A and B, of a given periodicity T.

The apparatus is of the same kind as that shown in FIG. 1 with the exception that measurement of the $P_i$ values is effected over a period 2T of the reference signal, the long signals being thus capable of exceeding the duration T.

It will readily be appreciated that it is subject to the same conditions of correct operation as far as the permissible noise is concerned.

In this embodiment of the apparatus, the reference wave is split into groups of four successive periods each of which will be called a "base interval." A gating signal is produced during the first half of each base interval thus over an interval of 2T and no longer T as before.

The second half of each base interval enables the return to the rest condition of any elements of the system which have been disturbed.

In FIG. 2, a reset to zero device, 100, with two outputs 130 and 131, has been illustrated.

The gating signal counter 9 has been split into a counter device proper, 90, with a capacity of $n-1$ (returning to 0 with its $n^{th}$ input signal), and a multivibrator stage 91 placed in the "0" state at the start of the measurement cycle through the output 130 of the device 100, and changing to its "1" state when the counter device 90 has received its $n^{th}$ input signal.

On the other hand, according to a preferred embodiment of the invention which is applied here, $n$ and $N_o$ are two numbers one of which is divisible by the other: it will be assumed that:

$$n = 1.000 \quad ; \quad N_o = 10.000$$

The input stage is here split into the constituent elements 101 to 114.

Its inputs $a$ and $b$ are the first inputs $a$ and $b$ of two gates 101 and 106 unblocked at the commencement of a measurement cycle, by a signal coming from the multivibrator stage 91, which signal is applied to their second inputs.

The gate 101 is followed by two multivibrators 102 and 104 so connected that the output of the second produces a signal of periodicity 4T, the first being placed in its "0" state at the beginning of the measurement cycle, by the output 130 of the device 100.

The signal of periodicity 2T supplied by the multivibrator 102 is applied on the other hand to a resistance-capacitance differentiator 103 producing a pulse for each trailing edge of this signal. These pulses, of periodicity 2T, are applied to a multivibrator 105.

The signals B, of nominal periodicity T, leaving the gate 106, are applied to a differentiator 107 identical to the differentiator 103 and producing a pulse for each trailing edge of the signal B. These pulse, of nominal periodicity T, are applied across an OR-gate 108, utilized for resetting the multivibrator stage 105 to zero at the commencement of each cycle, and across a polarity inverter 109 formed by an AND gate whose second input is not connected, to a second input of the multivibrator 105.

The multivibrator stage 105 is of the RS type, i.e., it is placed in its S state (set state), if not already in this state, by pulses received at its first input, and in its R state (reset state) if not already in this state by pulses of the same polarity received at its second input.

At the beginning of a measurement cycle, it is in its R state, and delivers at its output 115, rectangular signals $P_i$ whose duration may exceed T while at its output 116 it produces the reverse rectangular signals.

The outputs 115 and 116 of the multivibrator 105 are respectively connected to the first inputs of two AND-gates 112 and 113 the outputs of which are respectively connected to two signal inputs of an AND-gate 114 having a control input connected to the output of the multivibrator 104 so that it is blocked by the latter during the second half of each base interval.

The second inputs of the gates 112 and 113 are controlled by a switch 111 which opens the gate 113 when it is in the "-measurement" position, and opens the gate 112 when it is in the "calibration" position.

In the measurement position, the gate 114 therefore produces at its output a signal for each base interval.

This gate is followed by a polarity inverter 3 formed by an AND gate whose second input is not connected and the output of which is connected to the control input 40 of the gate 4 whose signal input 41 receives the pulses coming from the clock 2. These are thus transmitted during the time intervals $P_i$.

The pulses are applied to the main input 50 of the computer 5.

The computer 5 of FIG. 1 is here split into a first decade counter 52 acting as a divider by $1/n=1/1,000$, followed by a decade counter having a capacity of $N_o-1=10,000-1$, that is to say recording all the numbers from 0 to 9,999. This counter thus contains 4 decades in series, namely 53 to 56.

It will readily be appreciated that by applying $n_1$ correcting pulses to an auxiliary input 51 of the second decade 54 of this counter (this auxiliary input has been represented, for the sake of simplicity, as merely connected to the input of this decade which is connected to the output of the first), the output number recorded by the counter will be the same as if $N_1 + N_2 + ... \alpha \frac{1}{2} N_n + n_1 N_o$ had been applied to the main input 50 of the counter 5, no other inaccuracy being introduced since $N_o/n$ is a whole number.

Self-evidently, if $N_o/n$ were equal to 100, for example, the correcting pulses would be applied between the second and third decades of the counter 53–54–55–56.

More generally, if $N_o$ is a multiple of $n$, in the counter of capacity $N_o-1$, an auxiliary input of the computer device can be provided so that a pulse at this input is equivalent to $N_o$ pulses applied to the input 50. If $N_o=n$, then the auxiliary input of the computer will coincide with that of the counter of capacity $N_o-1$. If $n$ is a multiple of $N_o$, the auxiliary input of the computer device will be an auxiliary input of the counter 52.

The generator 6 of FIG. 1 is formed by two monostable multivibrators 62 and 63 which are placed in their quasi-stable states by the front edges of the gating signals coming from the gate 114, and respectively produce at their outputs 61 and 60, signals of duration $2T/3$ and $T/3$.

The long signal detector comprises an AND-gate 83, to the first input 81 of which, connected to the output of the polarity inverter 3, the gating signals are applied while to its input 80 the corresponding reference signals of duration $2T/3$ are applied, blocking the gate 83 during the time between 0 and $2T/3$ from the start of each base interval. The output of the gate 83 is connected to the first control input of a multivibrator 82 which is placed in its initial state by the reset-to-zero device 100 at the commencement of each measurement cycle, and which changes to its other state with the first signal applied to this input, then remaining insensitive to any ensuing signals applied to said same input. The output of the multivibrator stage 82 then, if necessary, produces the signal authorizing correction.

The device 7 of FIG. 1, comprises the elements 709 to 713.

The AND-gate 709 is supplied at its input 71 with the gating signals $P_i$ coming from the polarity inverter 3, and at its input 70 with the corresponding signals of duration $T/3$. The gate 709 is blocked by these signals of duration $T/3$ so that it produces an output pulse only for medium and long gating signals. Thus, during the course of a measurement cycle it produces $n'=(n_2+n_3)=n-n_1$ pulses.

These $n-n_1$ pulses are applied to the first input of an OR-gate 710 which transmits them to a counter 711 whose capacity is $n-1$, or in other words 0 to 999. The output of the counter 711 is connected to the first input of a multivibrator 712 which is initially placed in a predetermined state by a signal applied to its second input by the reset-to-zero device 100.

The counter 711, on reception of its $1,000^{th}$ input pulse, causes the multivibrator 712 to change to its other state.

The device 7 comprises, furthermore, a gate 713. This has a signal input and two control inputs; one of the latter, 72, is connected to the output of the multivibrator 82 so that this gate is blocked when the correction-authorizing signal is absent; the other control input, 79, is connected to the output of the multivibrator 712 so that the gate is inhibited when the counter 711 has received $n$ pulses. The output of the gate 713 is connected on the one hand to the auxiliary input 51 of the computer device 52 to 56 and on the other hand to the second input of the OR-gate 710.

The switch 10 is arranged between the clock 21 and the signal input 73 of the gate 713.

This switch is opened at the commencement of the measurement cycle by the reset-to-zero device 100 to which one of its two control inputs is connected, the other being connected to the output of the multivibrator 91 so that the switch is closed at the end of 1,000 measurements.

The following operations then take place:

The input gates 101 and 106 are inhibited.

If the gate 713 is blocked (that is to say if there has been no correction-authorizing signal), no additional pulse is transmitted to the computer.

In the contrary case, the pulses from the clock 21 are transmitted to this computer and to the counter 711 until the latter records $n$ by returning to zero, in which case $n-(n-n_1)=n_1$ pulses will definitely have been applied to the computer input, which is equivalent to $n_1$. $N_o$ pulses at the input 50. Then, the multivibrator 712 changes state blocking the gate 713.

Resetting to zero (or to the initial state), is effected by the output 130 of the device 100 for the elements 102, 105, 91, 712, 82, 10, for the element 105 via the gate 108 and the polarity inverter 109.

The resetting to zero of the computer elements is effected, for reasons which will become apparent later, through a different output, 131, of the device 100. The corresponding connections have not been shown in order not to overburden the drawing.

In FIG. 2, there has likewise been illustrated a control unit 110 bilaterally connected with the reset to zero device 100 and controlling, furthermore, the switch 111.

At this juncture, an explanation will now be given of the function of the apparatus when the switch 111 is in the "-calibrating" position.

Preferably, in order to eliminate not only the phase errors $e$ due to noise, but also any original phase error inherent in the system, the distances are measured in a differential manner by comparison between the result obtained in so far as the target is concerned and the result obtained from an internal reflector located at a known distance corresponding to a phase-shift itself corresponding to a time interval $P_o$ and giving rise in the "-measurement" condition, to signals $P_{oi}$.

In this case, after measurement of the duration P, relating to the target and translated by the number recorded by the counter 53–54–55–56 of the computer 5, the reset-to-zero operations will not affect the elements of the computer 5.

The switch 111 will be placed in the calibrating position and the beam directed onto the internal reflector. From that moment on, the gate 112 will be continuously unblocked and the polarity inverter 3 will produce signals of duration $2T-P_{oi}$.

The apparatus as described, taking into account the fact that the number produced by the counter of capacity $N_o-1$ is insensitive to multiples of $N_o$ pulses, will ultimately produce a number representative of: $P-P_o$.

Of course, the invention is in no way limited to the embodiments described and illustrated here.

In particular, the following modifications are clearly within the scope of these skilled in the art.

From the explanations given in relation to FIG. 1, it is evident that a phasemeter equivalent to that which has been described is obtained by connecting the first input of the correcting circuit to the output of the reference signal generator producing the reference signals of duration $\beta$.

The gate 709 is then blocked by the signals of duration $\beta$ and the counter 711 records the number $n_3$ of gating signals of duration greater than $\beta$, so that the number of correcting pulses, in the presence of a correction-authorizing signal, is then $n-n_3$.

Correction should then be dependent upon the presence of short signals, something which can equally well be expressed by the relationship: $n'<n$.

A variant embodiment of the system consists in utilizing as the criterion of authorization to correct, the absence of any signals of category II.

The criterion of authorization to correct, can then be expressed by $n_2=0$, or by $n'=n_3$. This is valid whether $L=\alpha$ or $L=\beta$.

It is also possible to increase the range of correct utilization of the phasemeter, as a function of noise, by utilizing more complex criteria for inhibiting or authorizing correction, and by adding to the phasemeter a device which rejects a result obtained, as a function of certain criteria relative to the distribution of the gating signals between the three categories.

What is claimed is:

1. A digital phasemeter for measuring the phase-shift $\Delta\Phi(0 \leq \Delta\Phi<2\pi)$ of a nominally periodic input signal in relation to a reference phase signal of the same periodicity T, comprising:

an input stage, having an output, for the production, from the input signal and the reference signal, of gating signals of duration $P_i$ equal to the time interval separating two homologous zero points in the input and reference signals;

a clock, having an output, for delivering pulses of recurrence frequency $F=N_o/T$, where $N_o$ is a positive integer;

a gating device comprising a signal input connected to said output of said clock, a control input coupled to said output of said input stage, and an output, for transmitting the pulses from said clock only in the presence of said gating signals;

a computer device coupled to said output of said gating device, for delivering, for each measurement cycle corresponding to the production of $n$ gating signals where $n$ is a positive integer, a number, equal, module $N_o$, to the whole number part of the quotient $S/n$, where:

$$S=R+N_1+N_2+...+N_n$$

$N_i$ ($i=1, 2... n$) being the number of pulses transmitted by said gating device during the time of the gating signal $P_i$, and $R$ a number determined by the initial state of the memory elements of the computer device;

a correcting circuit having: an output coupled to said computer device; first means for applying to said computer device, at the end of a measurement cycle, pulses, referred to as correction pulses, with the effect that number $N$ is automatically substituted by a number $N'$ which is equal, modules $N_o$, to the whole number part of the quotient $S'/n$, where $S'$ is equal to $S+(n-m)N_o$, where $m$ is the number of said gating signals whose duration exceeds a predetermined duration L smaller than T; and second means for authorizing or inhibiting the operation of said first means as a function of at least one criterion concerning the distribution of said $n$ gating signals into three categories, the first of which comprises the gating signals, whose duration does not exceed a given value $\alpha$, the second of which comprises the gating signals whose duration exceeds $\alpha$ without exceeding a given value $\beta$ greater than $\alpha$, and the third of which comprises the signals whose duration exceeds $\beta$, $\alpha$ and $\beta$ being two durations smaller than T, one of which is equal to said duration L.

2. A digital phasemeter as claimed in claim 1, wherein said second means are designed for authorizing or inhibiting the operation of said first means as a function of a single criterion, which is the presence, among said $n$ gating signals, of at least one gating signal in a predetermined one of said categories.

3. A digital phasemeter as claimed in claim 1, wherein said two numbers $n$ and $N_o$ being such that one is a multiple of the other: said computer device comprises in series a divider by $1/n$ having an input connected to the output of said gating device, and a counter counting from zero to $N_o-1$ and returning thereafter to zero, and wherein said computer device comprises an auxiliary output connected to the output of said correcting circuit and such that a pulse applied to said auxiliary output affects the number delivered by said counter in the same way as $N_o$ pulses applied to said input of said divider.

4. A phasemeter as claimed in claim 1, wherein said first means of said correcting circuit comprise a further counter counting from 0 to $n-1$ and returning thereafter to zero; means for applying to said further counter a pulse for each gating signal whose duration is greater than said duration L; a pulse source having an output; means for coupling said output of said pulse source, at the end of a measurement cycle, both to said computer device and to said further counter; and means for disconnecting said pulse source from said computer device when said further counter returns to zero.

5. A phasemeter as claimed in claim 2, wherein said value L is equal to $\alpha$, and wherein said second means are designed to authorize the operation of said first means when said $n$ gating signals comprise at least one gating signal of duration longer than $\beta$.

6. A phasemeter as claimed in claim 1, wherein said input stage further comprises means for generating, for each gating signal of duration $P_i$, a further signal $P'_i$ of duration $kT-P_i$, where $k$ is a predetermined integer, and means allowing the substitution of $P'_i$ for $P_i$ on said output of said input stage.

* * * * *

UNITED STATES PATENT OFFICE
CERTIFICATE OF CORRECTION

Patent No. 3,622,879          Dated November 23, 1971

Inventor(s) Andre Girouy et al

It is certified that error appears in the above-identified patent and that said Letters Patent are hereby corrected as shown below:

On the title page, after "72" insert:--
(73) Assignee: Saphymo-Srat, Paris, France Signed and sealed this 21st day of November 1972.

(SEAL)
Attest:

EDWARD M. FLETCHER, JR.          ROBERT GOTTSCHALK
Attesting Officer          Commissioner of Patents